Aug. 17, 1926.

L. MAMBOURG

GLASS MELTING FURNACE

Filed Feb. 7, 1923    4 Sheets-Sheet 1

1,596,058

INVENTOR
Leopold Mambourg
BY C.A. Rowley
ATTORNEY

Aug. 17, 1926.

L. MAMBOURG

GLASS MELTING FURNACE

Filed Feb. 7, 1923      4 Sheets-Sheet 2

1,596,058

INVENTOR
Leopold Mambourg
BY C. A. Rowley
ATTORNEY

Aug. 17, 1926.

L. MAMBOURG 1,596,058

GLASS MELTING FURNACE

Filed Feb. 7, 1923    4 Sheets-Sheet 3

INVENTOR
Leopold Mambourg
BY C. A. Rowley
ATTORNEY

Aug. 17, 1926.
L. MAMBOURG
1,596,058
GLASS MELTING FURNACE
Filed Feb. 7, 1923    4 Sheets-Sheet 4
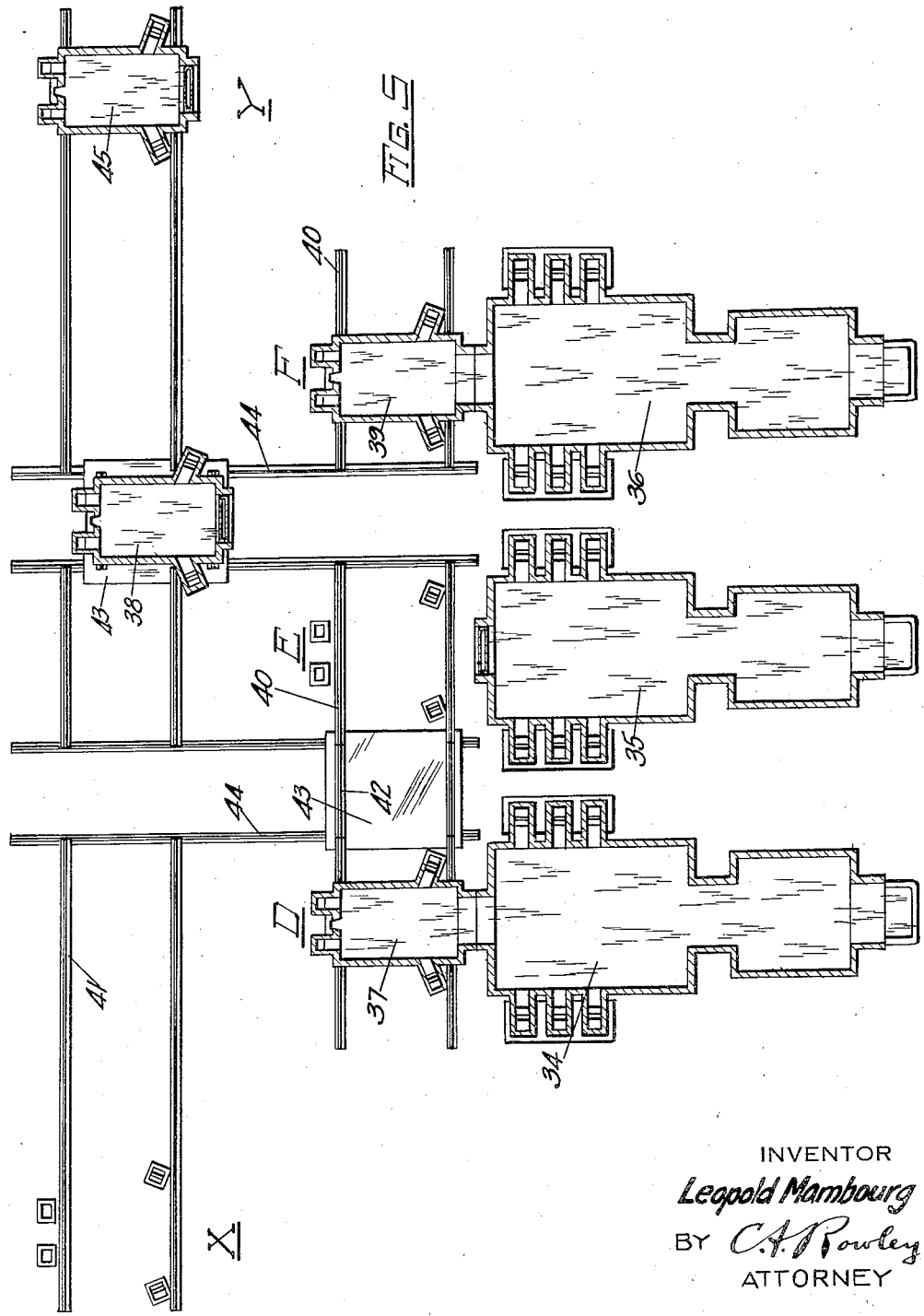
INVENTOR
Leopold Mambourg
BY C. A. Rowley
ATTORNEY Patented Aug. 17, 1926.

1,596,058

UNITED STATES PATENT OFFICE.

LEOPOLD MAMBOURG, OF LANCASTER, OHIO, ASSIGNOR TO THE LIBBEY-OWENS SHEET GLASS COMPANY, OF TOLEDO, OHIO, A CORPORATION OF OHIO.

GLASS-MELTING FURNACE.

Application filed February 7, 1923. Serial No. 617,432.

This invention relates to improvements in continuous tank furnaces, and more particularly to furnaces of this type for supplying molten glass to continuous sheet glass drawing machines, although the improvements are also applicable to furnaces for supplying glass to machines for producing glass bottles or other articles.

In a continuous tank furnace, the glass producing material, known as "batch" or cullet, or a mixture of the two, is, at short intervals, fed into the melting end of the tank where an intense heat is maintained to fuse the material and form the molten glass. This glass slowly flows through the "refining" chamber, and thence through the "cooling" chamber, to the machine, the glass settling down and acquiring a proper consistency and homogeneity during its passage through these latter chambers. These melting, refining and cooling chambers, are sometimes separate tanks in open communication with one another through necks or conduits, whereas in other installations, these chambers are nothing more than portions of one long continuous tank, the divisions being marked by different temperature conditions maintained in the different tank sections.

A very large mass of molten glass is maintained in these tanks, which is gradually withdrawn at the cooling end by the machines, and is correspondingly replenished by feeding in raw materials at the melting end. An immense amount of heat is taken up by this mass of glass and the furnace structure, and it takes many days to heat up the furnace and produce a sufficient mass of molten glass to begin working the machines. Therefore, to be efficient, such installations when once started must be worked continuously, and furnace shut-downs are very costly.

The glass-working machines, barring accidents, can be worked indefinitely, and if it becomes necessary to halt the machines for short repairs, the fires are maintained as usual on the furnace, so that operations may be immediately resumed when the machine is again in order. A complete shutdown only becomes necessary when the tank or a portion thereof, becomes so burnt-out that it must be rebuilt.

The most destructive action takes place at the melting end of the tank, and this portion is always the first to require rebuilding. The so-called "flux" materials included in the glass batch, such as lime, soda-ash and salt-cake, function to facilitate the melting of the sand or silica, and they exert the same destructive action, in a less degree, on the refractory, flux and silica blocks of which the tank is constructed. Also the acid-fumes given off during the melting process eat away the tank structure, and the checker-work of the regenerators, through which the outflowing gases pass. This action is most pronounced in the melting end of the tank, and it is usually necessary, at intervals of a few months or a year, to shut down the tank and rebuild this portion. This rebuilding process is slow and expensive. The tank must first be allowed to cool, and the molten glass run out, or, if allowed to cool in the tank, it must later be broken away, often with destructive effect on otherwise intact portions of the tank. When the tank cools off it shrinks and cracks, and settling of the arches often result. When the worn portions of the tank are rebuilt, it must be gradually filled with cullet and again heated up, a process requiring many days. During this rebuilding period of several weeks all production has ceased.

In the refining and cooling chambers (the larger portions of the tank), the wear is much less severe. The heat here is not so intense, and the flux materials are not present in so active a state. These portions of the furnace will ordinarily last for a period of years, without requiring a shut-down for repairs.

The principal object of the present invention is to provide a tank furnace system that may be operated continuously for several years, the necessary furnace repairs being accomplished without interrupting the operation of the tank or the machines. To accomplish this object, the large main tank, which feeds the molten glass to the glass-working machines, is only used to refine and cool the glass. Practically no melting takes place in this main tank, and there are substantially no destructive fluxes or acid gases present to wear away the tank. Not a very intense heat need be maintained, and this tank may be operated continuously for years before it requires rebuilding. The melting operation is confined to one of a plurality of smaller auxiliary tanks, from which the glass flows in molten form into the main refining tank. This melting tank will wear out after a few months' service, but prior to that time a second auxiliary melting tank is heated up and filled with melted cullet. When the first tank is cut-off from the main tank, the second tank is substituted and now supplies the main tank with molten glass. The first tank may now be rebuilt, and will in time be again substituted for the second tank when that one has worn out, and this cycle may be repeated indefinitely.

There are several ways in which the above principles may be carried out. In the preferred form of the invention, the melting tanks are mounted on movable platforms or trucks, so that the worn-out tank may be transported to a cooler spot where the rebuilding may be more comfortably accomplished, and the replacement tank, after being heated up at an auxiliary station, is moved into the position adjacent the main tank formerly occupied by the burnt-out tank. Other systems in which the invention may be embodied will be noted in the detailed description which follows.

Further objects and advantages of the invention will be apparent from the detailed description taken in connection with the accompanying drawings in which:

Fig. 3 is a vertical longitudinal section on an enlarged scale through the auxiliary melting tank and the adjacent end of the main refining chamber. This view is taken substantially on the line 3—3 of Fig. 1.

Fig. 5 shows, somewhat diagramatically, a typical plan for applying this system to a plurality or battery of glass furnaces, in the same factory.

Figure 1:
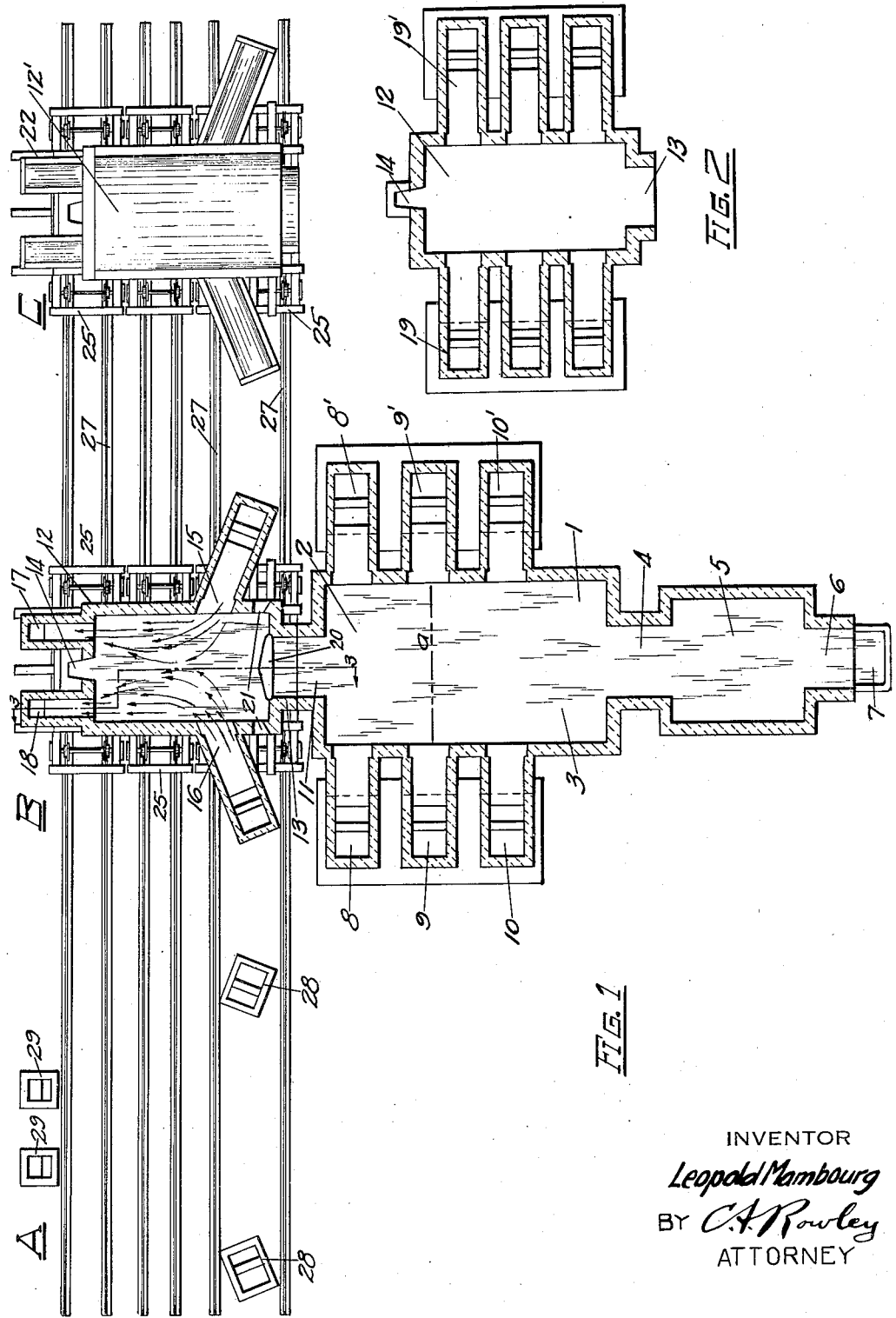
Fig. 1 is a horizontal section through one complete furnace unit.

Referring first to Figs. 1 to 4, inclusive, the main tank 1 is substantially the same in form and detail as any typical continuous tank furnace now in common use. This tank 1 will ordinarily comprise a forward portion 2 in which the melting process is carried out and a rear portion 3 which serves as the refining end of the tank. This may communicate through a restricted opening or neck 4 with an auxiliary refining chamber 5, from which the glass flows through cooling chamber 6 to the draw-pot 7, from which the molten glass is drawn away by the glass-working machine. The form of tank just described merely illustrates one of many that may be used, the invention about to be described not being limited to any particular form of continuous tank furnace. The glass in the main tank 1, is preferably heated by a series of regenerators 8, 8', 9, 9', 10 and 10', as illustrated in Fig. 1. The gas and air will pass in at port 8 and the products of combustion will be drawn out through port 8', or vice-versa, when the direction of flow is reversed at fixed intervals of time. This system of heating the furnace is well-known and needs no further description. The number of pairs of regenerators used may vary as the size or proportions of the furnace may require.

In ordinary practice, the glass producing materials (batch or cullet) would be introduced into the furnace at 11 and would then be melted in the end 2 of the furnace. A distinct flux line, or "foam" line, would be formed about as indicated at a. Back of this line the materials are in a partly melted state, whereas beyond the line a, only molten glass is found. It is in this portion of the furnace between the entrance neck 11 and the line a that the greatest deterioration of the furnace structure takes place. The fluxes used in melting the glass eat into the refractory blocks of the tank and so destroy the furnace structure that this portion of the tank must be rebuilt at intervals of several months or a year.

In my improved furnace system, all the melting process is carried out in an auxiliary tank, shown at 12, and the entire tank 1 is reserved as a reservoir for the molten glass, wherein it is refined and cooled to the proper working consistency. This auxiliary tank should have about the same capacity and glass surface area as that portion of tank 1 at the melting end 2, up to the flux line a. Practically the entire tank 12 is to be used for the melting process, the flux line being maintained as near the outlet of the tank as possible. When in normal position, this tank 12 communicates with tank 1 through the adjoining neck portions 13 and 11. The glass producing materials, such as batch and cullet, are introduced into tank 12 through a suitable dog-house 14. Preferably, the melting is accomplished by a direct fire process, the air and gas entering the tank through the inlet ports 15 and 16 adjacent the exit end of the tank and the gases being exhausted through outlet ports 17 and 18 near the front or entrance end of the tank. In this way the flow of heating gases will be in opposition to the flow of the molten glass and hence be more effective. Since the heating gases flow lengthwise of the furnace, as indicated by the arrows, they have a maximum contact with the glass-forming materials and hence more heating efficiency is obtained than would be the case with gases drawn crosswise of the tank. Any approved means may be employed for preheating the air and gas before it flows in through ports 15 and 16.

Figure 2:
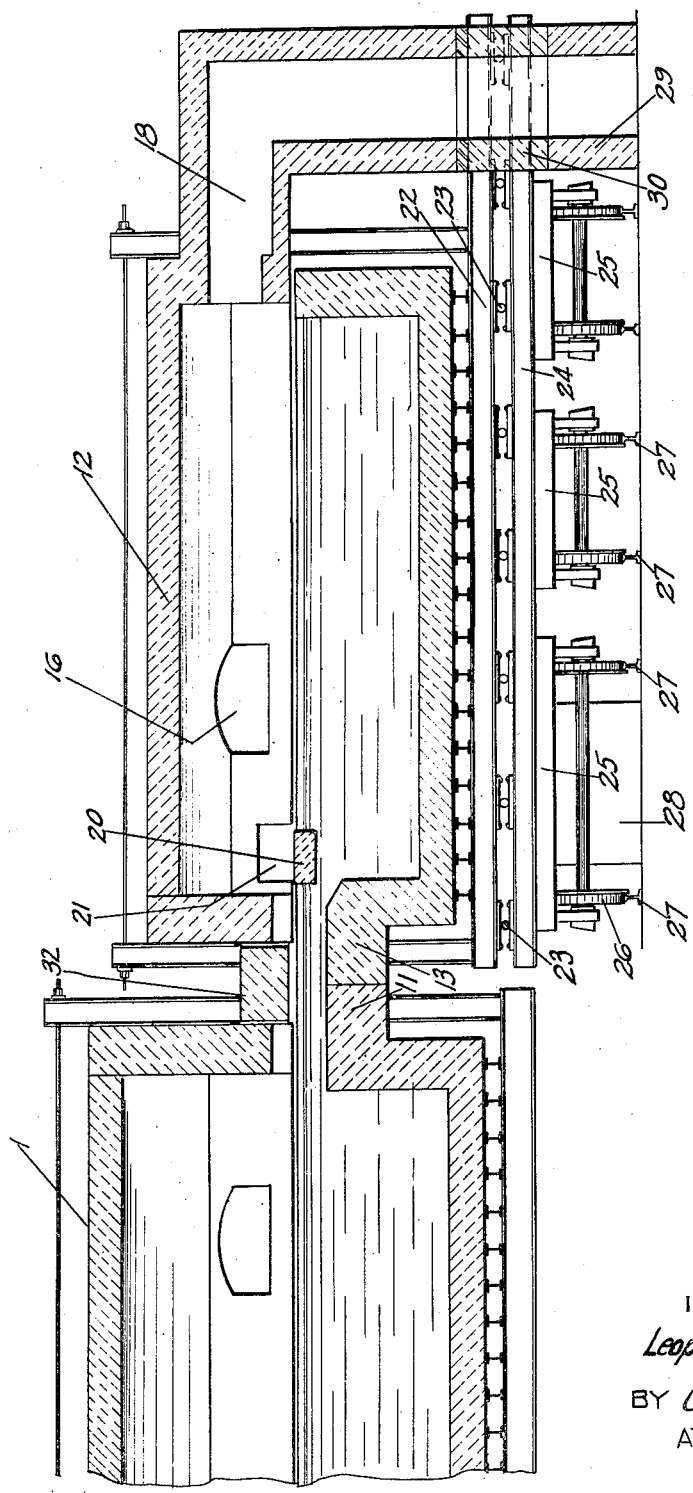
Fig. 2 is a horizontal section through a modified form of melting tank.

If desired, this auxiliary tank may be heated by reversing regenerators 19, 19', as indicated in Fig. 2, instead of by the continuous fire process shown in Fig. 1. This is the ordinary system for heating such tanks and needs no further description.

Adjacent the exit passage 13 of tank 12 is a floater 20 for holding back the scum or unmelted materials that might pass out through the neck 13. This scum will be diverted to the sides of the tank and may be removed through openings 21 in the side walls of the tank. The glass which flows into main tank 1 will be in an entirely melted condition, and the entire tank 1 is reserved for the refining and cooling process. A much less intense heat need be maintained in this tank by the regenerators 8 to 10, and since there is almost an absence of free flux materials in this tank the wear on the tank structure will be so materially reduced that the tank may be used continuously for many years without the necessity of shutting down for repairs.

The melting tank 12, however, where the intense melting heat is maintained, will be seriously eaten away by the heat and flux materials after a few months' service and must be repaired. To allow for this, without interrupting the continuous use of the main tank, a substitute heating tank is maintained which may be used interchangeably with the tank previously in service. In its complete form, for a single tank unit as illustrated at Fig. 1, my system comprises three heating stations A, B and C for the melting tank, and a pair of duplicate interchangeable melting tanks 12 and 12'.

Each tank 12 or 12' is mounted on a movable foundation or truck whereby it may be transported from one heating station to another. Specifically, the tank is supported directly on a platform 22, which in turn is supported through a series of rollers 23 on a second platform 24. The lower platform 24 is carried by a plurality of trucks 25, the wheels 26 traveling on a series of parallel rails 27, which extend beneath the melting tanks at right angles to the center line of the furnace.

At each heating station, suitably located between the rails 27 and extending up from below, are the entrance ports 28 for the preheated gas and air, and also the exit ports 29 for the exhaust gases. When a furnace 12 or 12' is located over one of these heating stations, the entrance ports 28 will be in communication with the ports 15 and 16 of the furnace and the gases from exhaust ports 17 and 18 of the furnace will pass down through the outlet ports 29. When a melting tank is in position over one of these heating stations, the hiatus between the adjacent ends of ports 18 and 29 (see Fig. 3) is filled with a temporary structure of refractory material as shown at 30. The same method is used on each of the other inlet or outlet ports. When the tank is to be moved, the fires are shut off, and these temporary connections are broken away.

Figure 4:
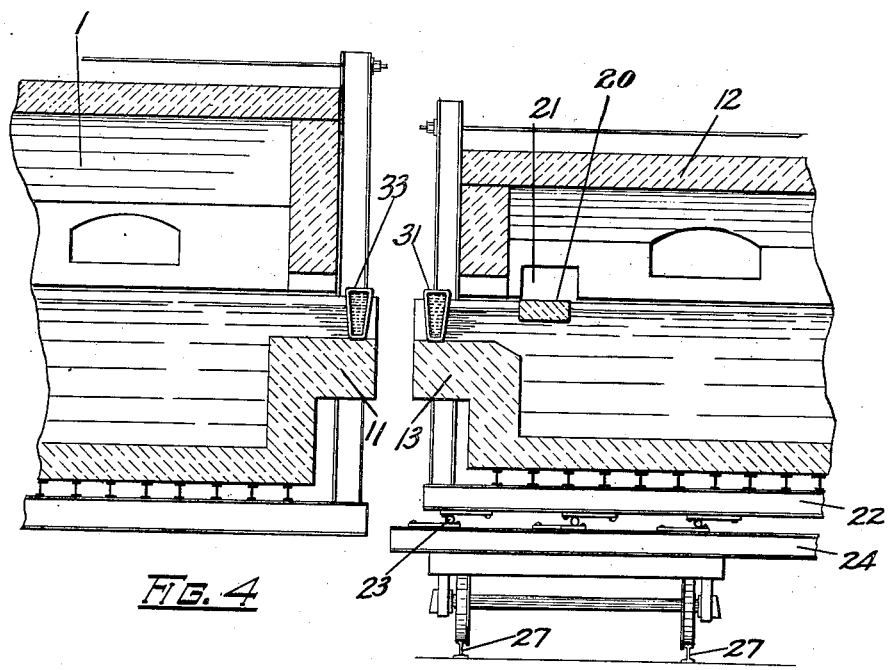
Fig. 4 is a view similar to Fig. 3, showing the melting tank and refining tank separated from one another preparatory to substituting a new melting tank.

In normal operation, one of the melting tanks or containers, such as 12, Fig. 1, will be in working position adjacent the main tank 1. The second tank 12' will be at one of the auxiliary stations, such as C, where it is being rebuilt or repaired. Of course, while this rebuilding process is under way, no heat need be maintained on the tank 12' at station C. When it is noted that the tank 12 now in use has become so far destroyed that repairs are necessary, the fires are started at the auxiliary station C and cullet is gradually fed into the auxiliary tank 12' until this tank is filled with molten glass. The exit passage 13 may be temporarily closed by means of a water-cooled gate similar to that shown at 31, Fig. 4. This process of preparing the auxiliary tank 12' for duty will take several days, but in the meantime, the operation of the main tank is still being carried on by means of the duplicate melting tank 12. When the auxiliary tank 12' is ready for service, the cover arch 32 for the passage joining tank 12 to the main tank 1, is removed and suitable water-cooled gates 31 and 33 are inserted in the necks or passages 13 and 11 to prevent further flow of molten glass from tanks 12 or 1. The two neck portions 13 and 11 are then broken apart and the tank 12 is moved away from the main tank 1, as shown in Fig. 4, this movement being made possible by the rollers 23 between the two supporting platforms 22 and 24. The tank 12 is now bodily transported on its trucks and supporting platforms from the main station B to the auxiliary station A, and immediately thereafter the duplicate melting tank 12' is transported from station C to the main station B. The neck portions 11 and 13 are moved into working relation with one another and the inlet and outlet ports 15, 16, 17 and 18 are suitably joined up with the similar ports 28 and 29 at station B. The coolers 31 and 33 are then removed and the cap arch 32 restored to its original position. The operation may now be carried on as before, the molten glass now being supplied to the main tank 1 from the auxiliary tank 12'. This entire process of substituting one melting tank for the other may be accomplished in a short period of time, and the level of molten glass in tank 1 will not be materially lowered during this interval.

The molten glass may now be drained from tank 12 which is at station A, and after this tank has been allowed time to cool, it may be repaired or rebuilt at leisure while the companion tank 12′ is in service. When tank 12′ has been worn out at the end of several months, the process of interchanging tanks above described, may be again performed, this time auxiliary tank 12′ being moved back to station C and the tank 12 being moved from auxiliary station A to the main station C. This cycle may be repeated for several years before a general shut-down for repairs to the main tank is necessary.

In Fig. 5, is illustrated one of the numerous ways in which this system could be adapted to a plurality of adjacent tanks in the same factory. By way of example are shown three tanks or glass melting units 34, 35, and 36. Obviously, the system about to be described is applicable to a greater number of tanks. The heating stations D, E and F for the respective melting tanks 37, 38 and 39 of the furnaces 34, 35 and 36, are substantially the same as already described in connection with Fig. 1. A trackway 40 at right angles to the center lines of the furnaces runs beneath each of the auxiliary melting tanks and may be substantially the same as that shown at 27, Figs. 1 to 4, and already described. At suitable points X and Y, are a pair of auxiliary heating stations and these stations are connected by a second trackway 41, preferably parallel to the trackway 40. Between each pair of stations D and E, or E and F, a section 42 of the track 40, is carried on a car or truck 43, movable on tracks 44 at right angle to the tracks 40 and 41. The track sections 42 may be moved over along tracks 44 until they join in and form a continuous portion of trackway 41. By this means, an auxiliary melting tank such as 38, which has been moved along tracks 40 onto the car or truck 43, may be transported to the trackway 41 and thence to either auxiliary station X or Y. As shown in Fig. 5, an auxiliary melting tank 45 is being heated up at station Y and the tank 38 which has been in use at furnace 35 is to be repaired. Tank 38 has been moved from station E onto the platform 43 and is being carried over on trackways 44 to a position on tracks 41. The auxiliary tank 45 will then be transported by means of the several trackways 41, 44 and 40, to position at the heating station E. It will be seen that with such a system a large number of similar furnaces may be kept in continuous service with the use of only one or two auxiliary melting tanks.

Figure 6:
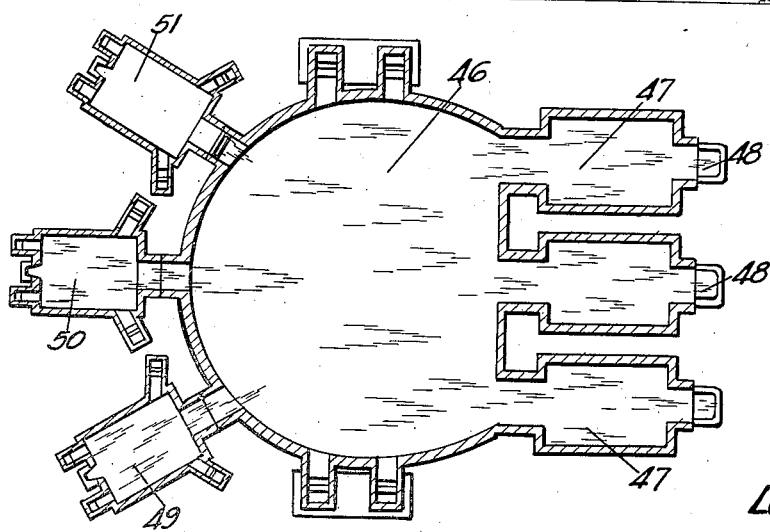
Fig. 6 is a horizontal section illustrating a modified form of the invention.

In Fig. 6, is shown a different construction in which some of the main principles of this invention are incorporated. In this installation the main refining tank 46 has a generally circular form, the glass flowing from this main tank into a series of cooling tanks 47 from which the cooled and refined glass is fed at 48 to the glass-working machines. The molten glass is supplied to the main refining tank 46 from a series of auxiliary melting tanks such as 49, 50 and 51, each of which is of the same general type already described. However, these melting tanks are permanently located in fixed relation to the main tank 46 and need not be transported from place to place. The relative size and proportions of the melting tanks 49 to 51 and the refining tank 46 are such that there is one more melting tank than is necessary to furnish an adequate supply of molten glass to the refining tank 46. In this way, any one of the melting tanks, such as 51, may be cut off and drained for repairs without halting the operation of the main tank 46 and the machines 48 fed therefrom. When the tank 51 has been repaired or rebuilt, it may again be put in service and one of the other tanks 49 or 50 closed down for repairs.

With either improved type of furnaces, a distinct temperature line may be maintained between the melting and refining tanks, which would not be possible where the melting is accomplished in one end of a continuous open tank. Only a mild refining fire, and hence much less fuel consumption is required in the main tank, and due to their small and compact formation, the melting fuel used in the auxiliary melting tank will be less than has customarily been required. The small melting tanks are simply constructed and relatively inexpensive. The large extra production, resulting from not being required to shut down the main tank for long periods each year, will soon pay for the small additional installation.

Although this system was particularly designed for use with continuous sheet glass drawing machines, it is apparent that it is in nowise limited to such use, as the furnaces may furnish molten glass to any continuously operating machines for producing glass articles. Also wide variations are possible in the forms and proportions of the main tanks as well as the auxiliary melting tanks, without departing from the essential features of this invention, as set forth above, and in the following claims.

Claims:

1. A continuously operable glass melting unit, comprising a refining tank, a pair of melting tanks for alternately supplying molten glass to the refining tank, a plurality of heating stations for the melting tanks, and a transportation system whereby the melting tanks may be moved from one station to another.

2. A continuously operable melting unit, comprising a refining tank, a pair of melting tanks for alternately supplying molten glass to the refining tank, a plurality of heating stations for the melting tanks, a movable platform on which each melting tank is mounted, and a trackway on which the platform may be shifted from one station to another.

3. The method which consists in introducing molten glass into a refining tank, melting raw materials in a tank disconnected from the refining tank and subsequently uniting said tanks and causing a union of the glass in the two tanks into a single pool.

4. In a continuous tank furnace, a melting tank, a refining tank, and a neck or conduit connecting the two tanks, the melting tank being bodily movable away from operating connection with the refining tank.

5. In a continuous tank furnace, a melting tank, a refining tank, a neck or conduit connecting the two tanks, the melting tank being bodily movable away from operating connection with the refining tank, and means for closing the conduit while the tanks are separated.

6. In a continuous tank furnace, a refining tank, and a pair of bodily movable melting tanks, each melting tank being independently movable into or out of operating communication with the refining tank.

7. In a continuous tank furnace, a refining tank, a pair of bodily movable melting tanks, each melting tank being independently movable into or out of operating communication with the refining tank, and an auxiliary set of inlet and outlet port connections, the melting tank not in service being movable into communication with these auxiliary port connections.

8. A battery of continuous tank furnaces comprising a series of permanently located refining tanks, and a series of bodily movable melting tanks, there being more melting tanks than refining tanks, one of the melting tanks being normally positioned in feeding communication with each refining tank, an auxiliary heating station for a melting tank while out of normal working position, and a transportation system for interchangeably moving any melting tank to the auxiliary station or into operating relation with a refining tank.

9. A continuously operable glass melting unit, comprising a refining tank, a plurality of melting tanks for alternately supplying molten glass to the refining tank, means for heating said melting tanks when not in operative connection with the refining tank, and means for moving the melting tank into and out of operative position.

10. A continuously operable glass melting unit, comprising a refining tank, a plurality of melting tanks for alternately supplying molten glass to the refining tank, means to cut off the supply of glass from the melting tanks, and a transportation system whereby the melting tanks may be moved into and out of an operative position.

11. A continuously operable glass melting unit, comprising a refining tank, a plurality of melting tanks for alternately supplying molten glass to the refining tank, means for heating the melting tanks when not in operative connection with the refining tank, means to cut off the supply of glass from the melting tanks, and a transportation system whereby the melting tanks may be moved into and out of an operative position.

Signed at Lancaster, in the county of Fairfield, and State of Ohio, this 2d day of February, 1923.

LEOPOLD MAMBOURG.